United States Patent [19]
Keller

[11] Patent Number: 5,303,096
[45] Date of Patent: Apr. 12, 1994

[54] MERGING OF HEADS INTO DISK DRIVES USING LOW MELTING WAX

[75] Inventor: Christopher G. Keller, Rochester, Minn.

[73] Assignee: International Business Machines Corporation, Armonk, N.Y.

[21] Appl. No.: 913,252

[22] Filed: Jul. 14, 1992

[51] Int. Cl.⁵ .................................... G11B 5/012
[52] U.S. Cl. ............................ 360/97.01; 360/97.03
[58] Field of Search .................... 360/97.01, 97.03

[56] References Cited

U.S. PATENT DOCUMENTS

| | | |
|---|---|---|
| 3,562,442 | 2/1971 | Pear .................................. 360/121 X |
| 3,639,976 | 2/1972 | Hoogendoorn et al. . |
| 4,398,228 | 8/1983 | Bauck ................................. 360/77 |
| 4,761,699 | 8/1988 | Ainslie et al. . |
| 4,897,915 | 2/1990 | Ito . |
| 4,962,584 | 10/1990 | Matsuda et al. . |

FOREIGN PATENT DOCUMENTS

| | | | |
|---|---|---|---|
| 62-143218 | 12/1987 | Japan ................................ 360/128 |
| 2-122406 | 5/1990 | Japan . |
| 1367334 | 9/1974 | United Kingdom . |

*Primary Examiner*—A. J. Heinz
*Attorney, Agent, or Firm*—Susan L. Firestone; Andrew J. Dillon

[57] ABSTRACT

A method of merging a head suspension assembly into a plurality of disks for disk drives using a low melting wax is shown. The wax in the method of the invention protects and guides the heads during assembly into a disk drive. A preferred embodiment of the invention guards the head from damage during packaging and transport. The invention also describes a head suspension assembly for information storage and retrieval systems featuring a slider with wax covering at least part of the slider.

38 Claims, 5 Drawing Sheets

MERGING OF HEADS INTO DISK DRIVES USING LOW MELTING WAX

BACKGROUND OF THE INVENTION

1. Technical Field:

This invention relates to a method of merging head suspension assemblies into disk drives using a low melting wax. In particular, the invention relates to an improved method for protecting sliders and disks during handling while storing, shipping and assembling disk drives. The invention also relates to an improved slider which is embedded in wax.

2. Description of the Related Art:

In a disk drive or direct access storage device, the disk files are information storage devices which utilize at least one rotatable disk storing information on concentric data tracks. A transducer reads information from or writes information to the various tracks on the data disk. The transducer forms a portion of a "head" which is attached to a slider, forming the head. The slider is attached on its backside to the suspension. The suspension in turn is connected to the actuator arm. The actuator arm positions and maintains the head over the desired track during read and write operations. These parts are assembled into the actuator.

In a traditional disk drive, the rotation of the disk creates a cushion of air over the disk that allows the slider to lift off and float over the disk. The actuator arm suspension provides dimensional stability between the slider and the actuator arm by compensating for the force of the air between the slider's air bearing surface and the disk surface. The suspension controls slider flexibility relative to its directions of motion while resisting out-of-plane movement. This action keeps the slider close to the disk surface without allowing contact between them.

The suspension typically comprises a load beam attached to the actuator arm and a flexure which connects the slider to the load beam. The load beam balances the slider by counteracting the lifting force from the spinning disk. The flexure supports the slider and allows flexibility during the slider's ride on the cushion of air. Such a suspension is described in U.S. Pat. No. 4,167,765, which is assigned to the same assignee as this application.

In a disk drive using a self-replenishment, lubrication system, a liquid lubricant replaces the cushion of air. The sliders do not float above the disk in this system, but ski in the liquid. These sliders glide in a lubricant during track following, like a water skier gliding in a thin layer of water at high speed. There are several milliliters of lubricant in such a disk drive.

Assembly of disk drives is labor intensive. Parts are often manufactured and tested in one place and assembled in another. For instance, a slider may be machined, tested and attached to the suspension assembly to form the head suspension assembly, then boxed for shipment. Any damage makes the head suspension assembly unusable, thereby wasting the part.

Damaged sliders are serious problems in the industry. Sliders are usually made of a hard brittle material, such as a ceramic. If the slider is subjected to a shock, such as dropping or hitting, the slider may crack, chip or break. For example, if the slider of the head suspension assembly has small bearing pads, any damage such as chipping removes a large percentage of the slider bearings and causes an irregular surface. If a chipped slider touches the disk, the hard surface scratches and destroys the disk. The same type of damage occurs with other slider surfaces, for example, rails, grooves, and other textured surfaces. Another situation where damage occurs is when the actuator is handled harshly during shipment. In some circumstances, the actuator holds eight pairs of opposing heads. If the actuator is roughly handled, the heads may hit each other, a phenomenon known as head slap. Simply setting the actuator's shipping container down too hard can cause head slap. Head slap causes chips, dents, cracks, and the like, rendering the heads unusable.

In the case of air bearing sliders, the prior art uses mechanical fixtures to protect the sliders. However, head slap still occurs occasionally due to operator error.

Near contact recording disk drives have very small spaces between the disks. A disk stacking tolerance allows the greatest possible number of disks stacked without wasting any space. This tight tolerance accommodates the worst case scenario, allowing parts to hit without being damaged. The tight tolerance must accommodate back-to-back sliders, arms, spacer rings and the like, all of which vary slightly after manufacture. For the slider, no more than three standard deviations from the mean of the slider size are allowed. For example, a 0.45 mm thick slider allows deviations of no more than a mere 0.05 mm in its thickness. Consequently, merging the slider with the disk is a tight squeeze without much room for error.

Merging the sliders between the disks requires careful manipulation. During merge, the small, fragile heads must squeeze between the delicate disks without touching. If the heads and disks touch, the pressure from contact can damage both heads and disks, thereby rendering them unusable. The same types of problems can occur when moving the head to the landing zone. If the slider touches the disk during movement to the landing zone, and a hard particle of contaminant becomes wedged between the slider and disk the slider can scrape the disk like a needle scrapes a phonograph record. The scraping may scratch and ruin the disk.

One object of the invention is to protect the head suspension assemblies from damage during shipment and handling.

Another object of the invention is to ease the merge operation between the head and the disk during assembly.

Another object of the invention is to guard the head and disk from damage during merge and positioning the head on the landing zone.

SUMMARY OF THE INVENTION

The method of the invention uses wax during the assembly of a computer disk drive. A slider with an associated head is mounted to a suspension to form a head suspension assembly. Next, the slider end of the head suspension assembly is at least partially covered with a layer of wax. Then, the head suspension assembly is merged with the disks of the disk drive by sliding the slider end over a selected disk to a predetermined landing zone. The wax is removed by heating or solubilizing in a lubricant.

In a preferred embodiment of the invention, a slider is wax coated after assembly into the head suspension assembly. The wax coated head suspension assembly is next attached to an arm, and the slider end of the assembly is placed into a mold. Additional molten wax is added to fill the mold. After solidifying, the mold is removed from the slider end. Then the slider end is merged with a disk of a disk drive and is guided to a landing zone on the disk. The wax is removed by either heating above the wax melting point, solubilizing in a lubricant or a combination of both.

The invention includes a slider that is at least partially coated with wax. The slider with wax is part of a head suspension assembly for information storage systems. Preferably, the slider is embedded in a thick layer of wax. Most preferably, a second thick layer of wax is molded onto the slider end of a head suspension assembly in a shape conducive for merging with a disk drive.

Other objects, features and advantages will be apparent in the written description that follows.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

These drawings are not intended as a definition of the invention but are provided solely for the purpose of illustrating the preferred embodiments of the invention described below.

DETAILED DESCRIPTION OF THE INVENTION

With reference now to the figures, the invention describes a method for protecting and merging head suspension assemblies for disk drives. The method uses a low melting wax to at least partially cover a slider which is part of a head suspension assembly.

The invention also includes a head suspension assembly produced by the method of the invention. This head suspension assembly has a slider that is at least partly covered with wax. The term "wax" as used within this disclosure and claims denotes any substance with the physical properties described below and can be used with the invention.

The wax can be any substance with the following properties. At room temperature, the wax exists as a nonsticky solid with a low shear strength. The wax of the invention melts between room temperature and 100° C., preferably at a temperature less than about 75° C. The wax/lubricant solution that results after assembly must be liquid at the lowest operating temperature of the disk drive.

In a recirculating lubricant disk drive, the wax can be any substance that is solid at room temperature and soluble in the lubricant. There are several milliliters of lubricant in such a disk drive, so it is easy to dissolve a few milligrams of wax from the sliders. The wax cannot precipitate out of the lubricant at the lowest operating temperature of the disk drive. Preferably, the wax is a boundary lubricating component of the lubricant. Lubricants include a wide range of solvent vehicles, such as oil or hexadecane.

The wax can be one component or a mixture of several components. A wax mixture may have different components with a range of melting points, such as octadecane and 1-docosanol with melting points of 28° C. and 71° C., respectively.

The wax can be selected from the group of high molecular weight, straight chain carboxylic acids and their esters; high molecular weight, linear alcohols and their esters; plant waxes; animal waxes; mineral waxes; synthetic waxes; and the like. Preferably, the wax is selected from the group consisting of octadecane, stearic acid, palmitic acid, a 50:50 [w/w] mixture of stearic and palmitic acids, 1-docosanol, or any combination of them. Most preferably, either stearic acid or the 50:50 combination of stearic and palmitic acids is used. In a self-replenishment, lubricating system, the final wax concentration is about 1% [w/w] of the 50:50 stearic:palmitic acids in hexadecane.

Figure 1:
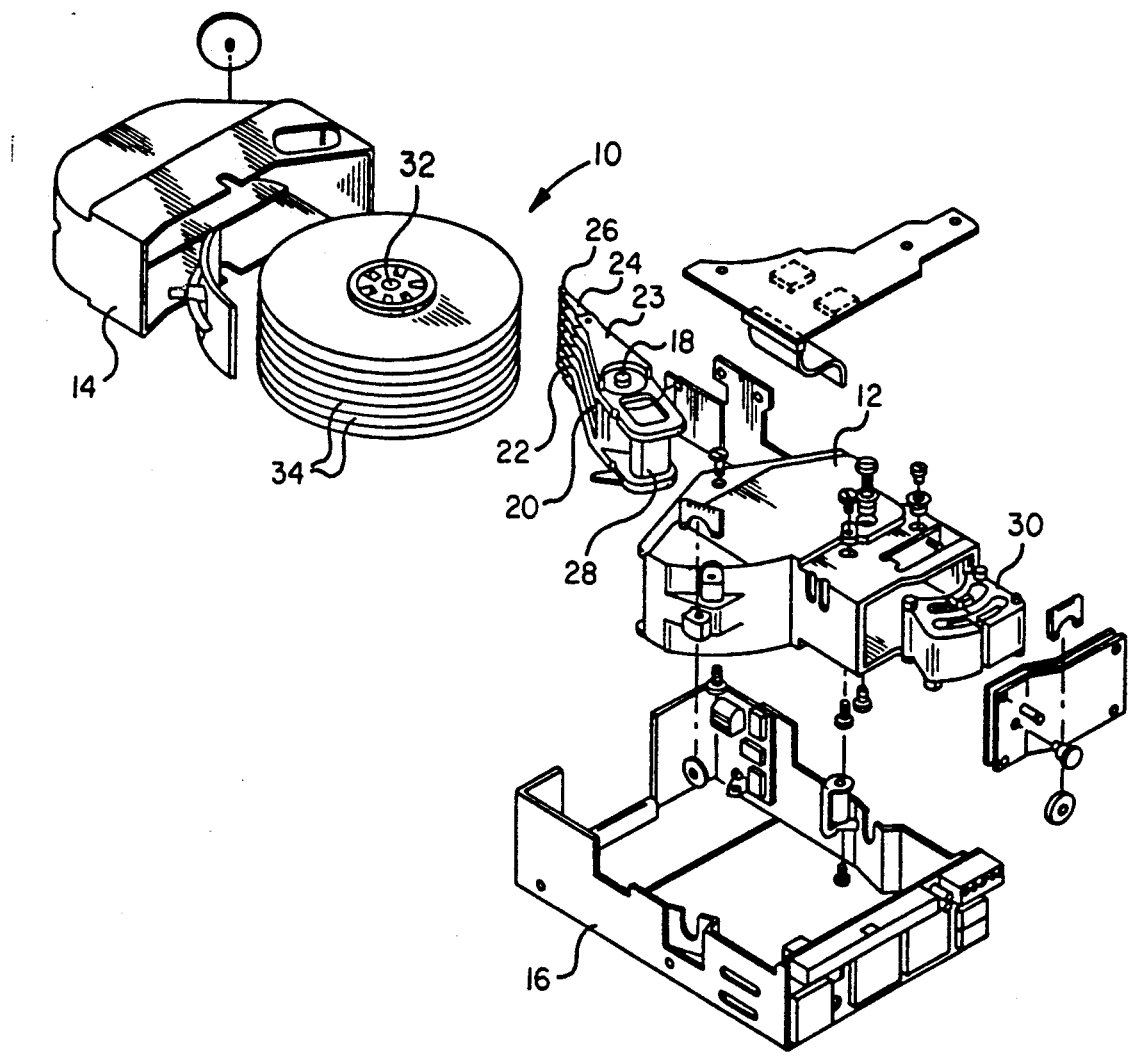
FIG. 1 is an exploded view of a disk drive or direct access storage device from the prior art.

The invention described in this application is useful with all mechanical configurations of information storage systems such as disk drives or direct access storage devices. FIG. 1 is an exploded view of a prior art disk drive 10. It should be noted that although a rotary actuator is shown, the invention described herein is also applicable to linear actuators. The disk drive 10 includes a housing 12, and a housing cover 14 which, after assembly, is mounted within a frame 16. Rotatably attached within the housing 12 on an actuator shaft 18 is an actuator arm assembly 20. One end of the actuator arm assembly 20 includes an E block or comb like structure 22 having a plurality of arms 23. Attached to the separate arms 23 on the comb or E block 22, are load springs 24. In this case, the load springs form the suspension. Attached at the end of each load spring is a slider 26 which carries a pair of magnetic transducers or the head. On the other end of the actuator arm assembly 20 opposite the load springs 24 and the sliders 26 is a voice coil 28.

Attached within the housing 12 is a pair of magnets 30. The pair of magnets 30 and the voice coil 28 are key parts of a voice coil motor which applies a force to the actuator arm assembly 20 to rotate it about the actuator shaft 1a. Also mounted within the housing 12 is a spindle shaft 32. Rotatably attached to the spindle shaft 32 are a number of disks 34. In FIG. 1, eight disks are attached to the spindle shaft 32. As shown in FIG. 1, the disks 34 are attached to the spindle shaft 32 in spaced apart relation. An internal motor (not shown) rotates the disks 34.

Figure 2:
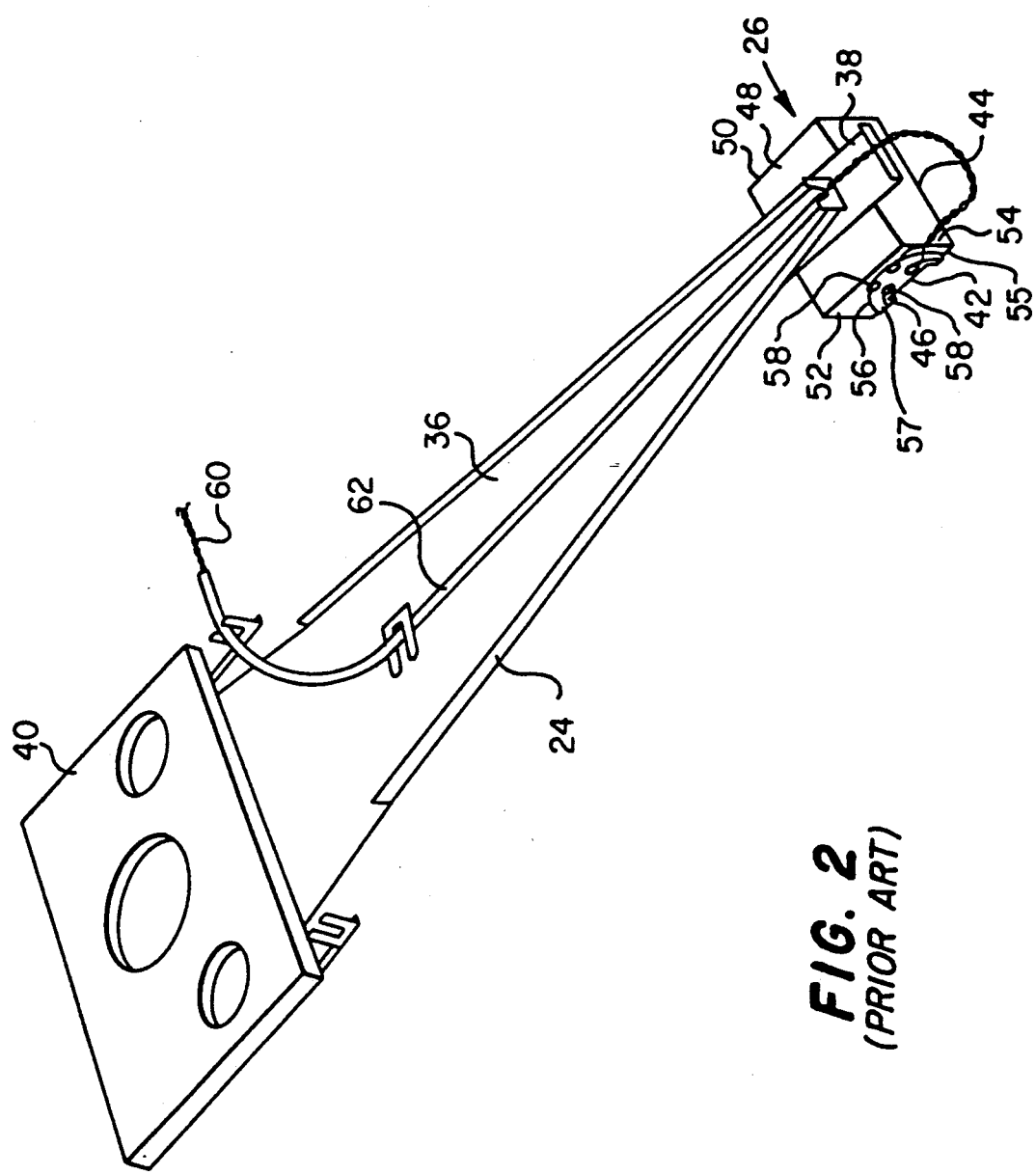
FIG. 2 is an isolated view of one type of a conventional head suspension assembly illustrating mechanical attachment of the slider.

A conventional head suspension assembly is illustrated in FIG. 2. For the purposes of this disclosure, the term "head suspension assembly" refers to a head which is mounted to a slider and the slider is mounted to a suspension. The suspension comprises a load beam 36 and a flexure 38 located at the end of load beam 36. The suspension is attached to the disk file actuator arm (not shown) by means of a mounting plate 40. The slider 26 is a conventional slider formed of ceramic material, such as a mixture of alumina ($Al_2O_3$) and titanium carbide (TiC). The slider 26 has an air bearing surface 42, which includes two rails 44, 46, a back side 48 opposite and generally parallel to air bearing surface 42, a leading edge 50 and a trailing edge 52, both of which form end faces oriented generally perpendicular to air bearing surface 42 and back side 48.

Located on the trailing edge 52 of slider 26 is the head formed by two thin film read/write transducers 54, 56. Typically, multiple thin film transducers are formed on a single slider, even though only one transducer is active as a read/write element, in order to improve the yield of the slider during the thin film fabrication process. The transducers 54, 56 have pole tips 55, 57, respectively, which extend toward the edge of respective rails 44, 46. Transducers 54 and 56 have electrical leads 58 for connection to the read/write electronics of the disk file.

In the conventional embodiment shown in FIG. 2, the electrical attachment to the read/write electronics is made by twisted wires 60 which extend from the read/write electronics, through a tube 62 on load beam 36 and out the end of tube 62. The ends of wires 60 are soldered or ultrasonically bonded to the leads 58 of active transducers 54 and 56.

In the invention, a head, a slider and a suspension can be assembled together to form the head suspension assembly by any method used in the industry. For instance, the slider attaches by a flexure to the load beam of the actuator arm. Or the slider may directly mount to load springs. For the purposes of the present invention, the slider can be any slider, including those with slider bearing pads, rails, etched surfaces, grooved surfaces, and the like. The slider may be used in any type of information storage system, including direct access storage device systems which incorporate air bearing systems, self-replenishment lubrication systems, and the like, although the self-replenishment lubrication system which uses a recirculating lubricant is currently preferred.

Figure 3A:
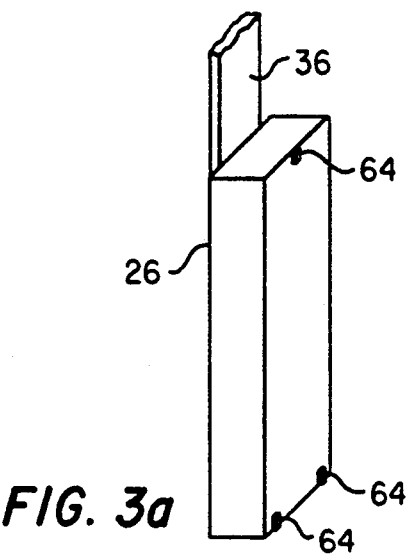
FIG. 3a is a view of a head suspension assembly with a slider attached to the suspension of the actuator arm before wax treatment.
Figure 3B:
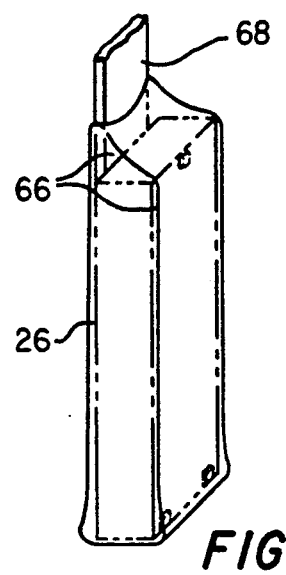
FIG. 3b is a view of similar to FIG. 3a but after wax treatment.

In the preferred embodiment of the invention, a slider is embedded with wax after forming the head suspension assembly. The slider is wax embedded using any method that leaves a thick layer of wax. Preferably, the slider is dipped into the molten wax. After this step, the head suspension assembly can be boxed and transported prior to any further assembly. For example, FIG. 3a portrays a slider 26 with bearing pads 64 and fastened to a load beam 36 prior to wax embedding. FIG. 3b, shows how the slider 26 of the head suspension assembly 68 may look after wax embedding. The wax 66 completely covers the bearing pads.

The head suspension assembly is next mounted onto the actuator arm. If desired, the head suspension assembly may be connected back-to-back to a second head suspension assembly, with the sliders oriented to face outward. The invention works well using other orientations of the head suspension assemblies, for example, outboard head suspension assemblies. For other orientations, a suspension separator clip may be needed.

Figure 4:
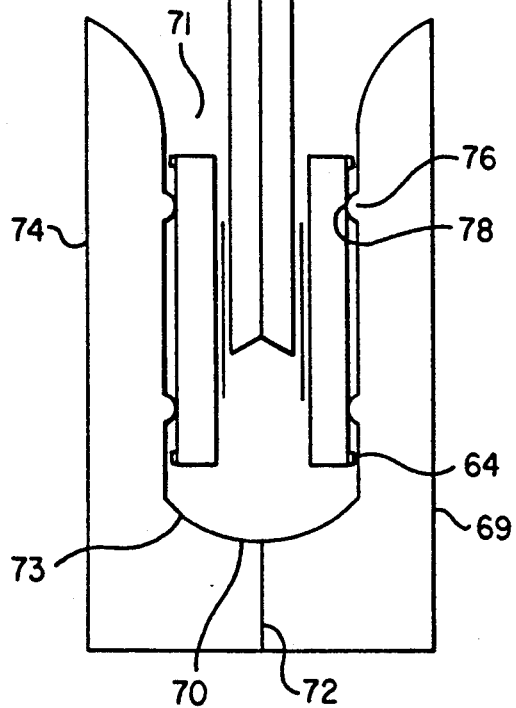
FIG. 4 is a cut-away view of two head suspension assemblies after the mold used in one of the method steps of the invention is in place.

A mold is then preferably placed over the slider end of the head suspension assemblies. FIG. 4 illustrates a cut-away view of the mold 69 with the head suspension assemblies 68 in the back-to-back position. The mold 69 can be any type of mold that can hold molten wax. The wax must cover any slider structures such as rails and bearings pads 64. Therefore, the mold's interior should be large enough to allow a thick layer of wax to envelop these surfaces. The mold 69 forms a well 71 for the wax. For this particular application, the wax layer also guides the head suspension assembly during merge with the disks of the disk drive. Preferably, the well bottom 70 slants or curves 73 as shown in FIG. 4. In this example, the mold's parting line 72 runs in a straight line from the well bottom 70 to the mold's exterior 74. The mold 69 does not touch the slider 26, except for the mold's stand-offs 76 which contact recessed areas of the slider 78. Similar types of molds can be designed for other types of sliders. Preferably, the wax layer should be about 1 to 40 $\mu$m thick.

The inner surface of the mold is preferably treated with any compound to ease the release of the wax embedded slider from the mold. Molten wax is poured into the mold and allowed to harden. The wax can be the same wax that originally coated the slider or a different wax, for instance a wax with a lower melting point. After the wax hardens, the mold is removed.

Figure 5:
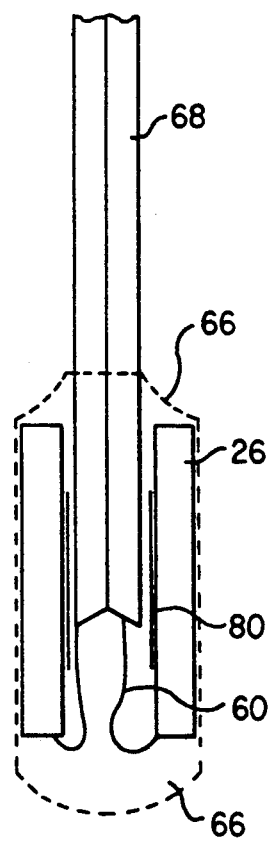
FIG. 5 is a cut-away view of a pair of wax embedded sliders, according to one of the method steps of the invention.

FIG. 5 is a cut-away representation of the wax embedded slider 26 after its removal from the mold. The wax 66 holds the head suspension assemblies 68 in the back-to-back position without requiring a suspension is separator clip. As illustrated, the slider 26, flexure 80 and headwires 60 are completely embedded in the wax 66. The head suspension assembly is now ready for shipment or further assembly into the disk drive.

Figure 6:
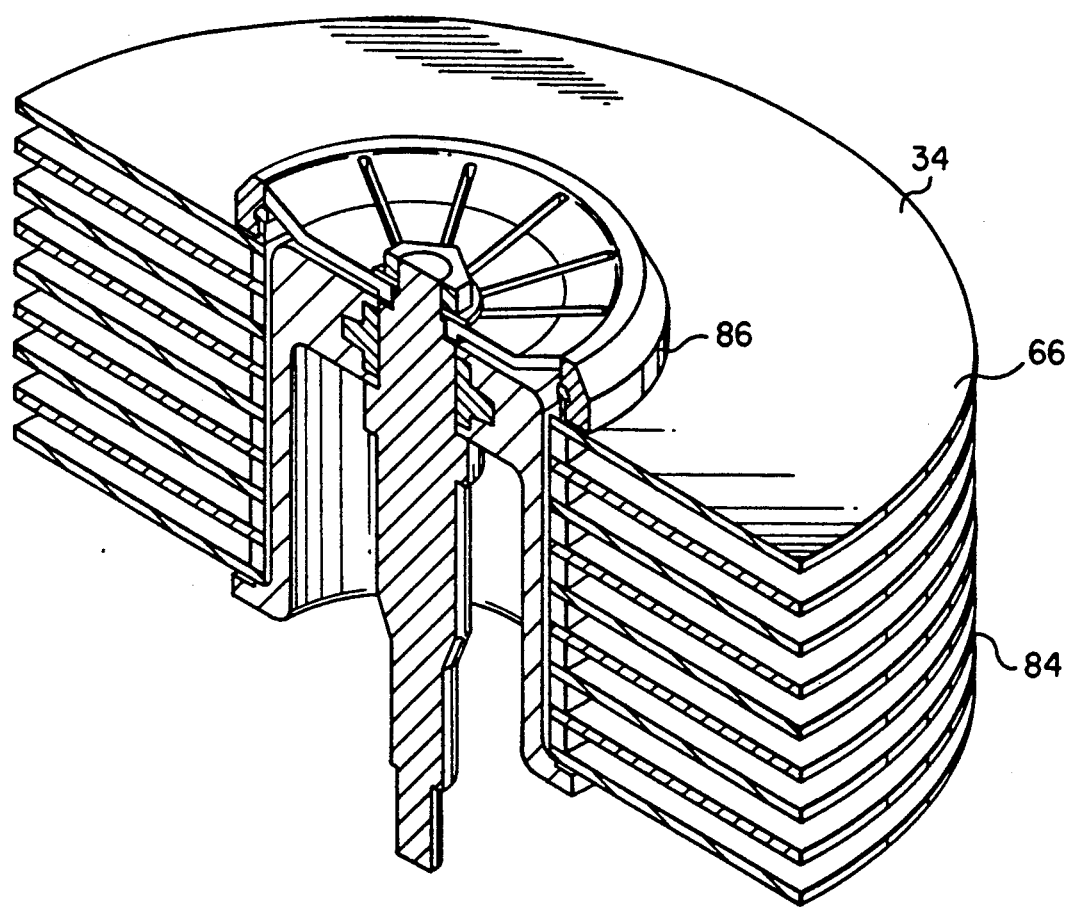
FIG. 6 is a perspective view, partially in section, of wax coated disks from a disk drive, further illustrating the method of the invention.

Merge is the assembly of the head suspension assembly between the stacked disks of the disk drive. The wax embedded slider merges into the tight spaces between the disks. Preferably, the disk is also wax coated with either the same or different wax. FIG. 6 shows an example of the wax coated disks 34 in a disk pack 84 from a disk drive with a cross-sectional view along the diameter. The disk's wax coating 66 covers all of the surface but the clamp area 86. The disk wax coating may be applied by dipping, spraying or spin applying the molten wax onto the disk.

Figure 7:
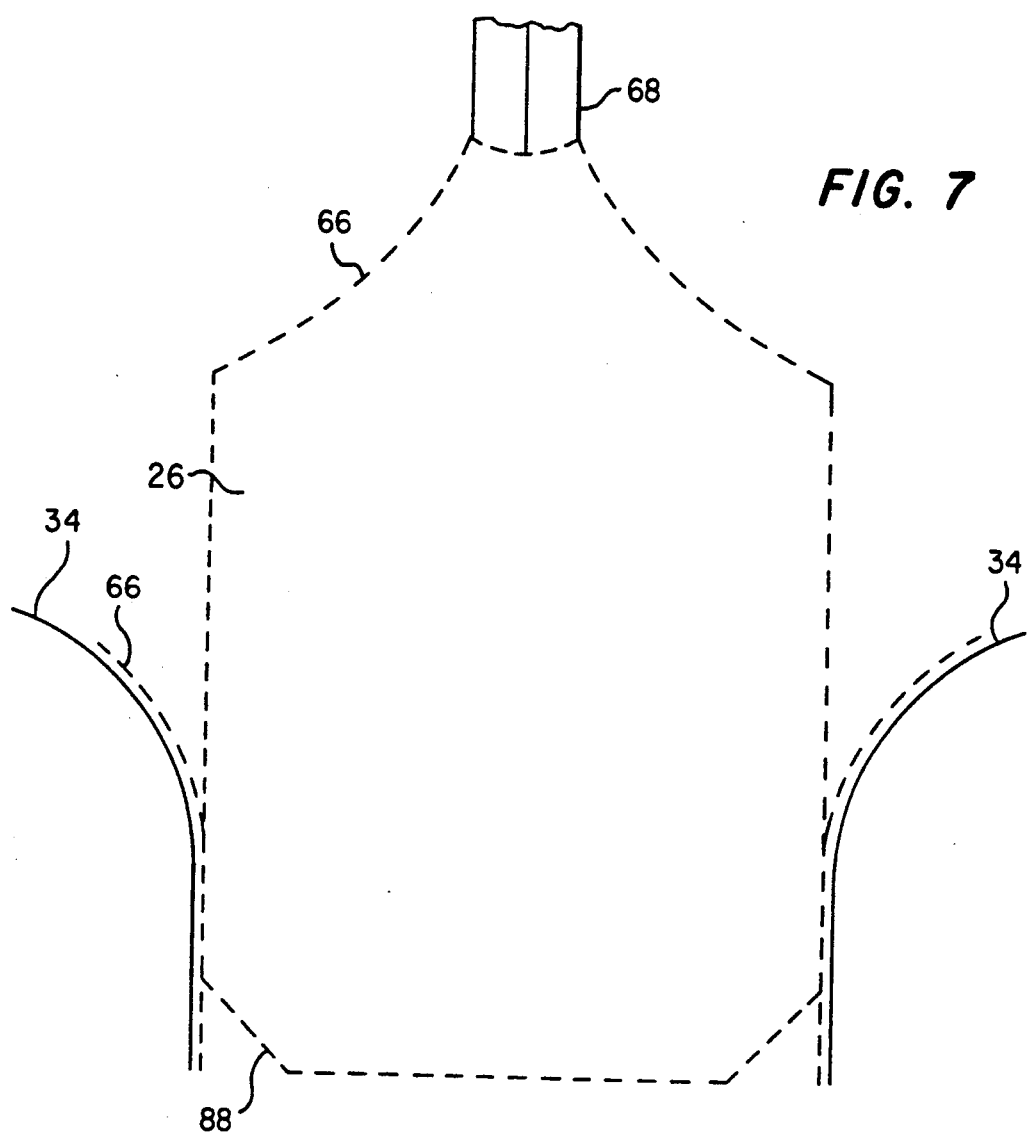
FIG. 7 is a schematic illustration of the wax guided merge operation between the sliders and the disks of the disk drive.

An example of the wax guided merge is found in FIG. 7. The wax embedded sliders 26 of the head suspension assemblies 68 slide into the space between the disks 34. There is zero tolerance between the head suspension assemblies 68 and the wax coated disks 34. The head suspension assemblies 68 and the disks 34 appear to touch. The curved portion 88 of the slider wax coating 66 helps guide the assembly between the disks 34. The wax also lubricates the merge.

Figure 8A:
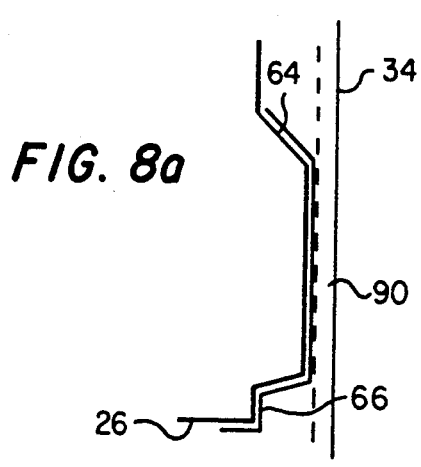
FIG. 8a is an example of a slider with bearing pads resting at the landing zone on the disk before wax removal.
Figure 8B:
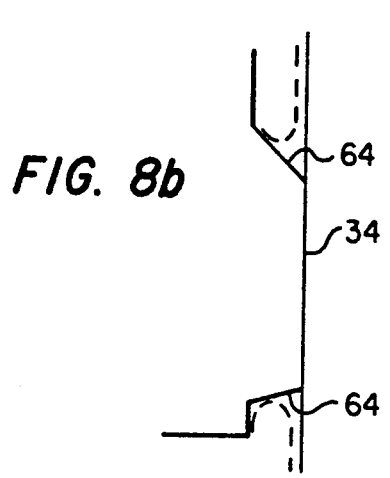
Figure 8b is a view similar to FIG. 8a but after wax removal.

Next, the head suspension assembly is moved to the landing zone of the disk. FIG. 8a is a close-up example of the invention at the landing zone 90 using a slider 26 with bearing pads 64. In FIG. 8a, the slider 26 rests on the disk 34. The slider 26, however, does not actually touch the surface of the disk 34. Only the wax 66 surfaces of the slider 26 and the disk 34 are in direct contact. Once the wax 66 is removed as shown in FIG. 8b, the slider bearing pads 64 touch the disk 34 and are ready for use.

Once in position, the wax can be removed. Simply heating above the melting point of the wax allows most of the melted wax to flow away. Spinning up the disk drive removes any excess wax. In self-replenishment lubricating systems, the wax removes easily by dissolving the wax in the lubricant. Heating the disk above the wax's melting point removes excess wax during the burn-in process of normal production. The temperature of the disk drives during normal use can reach 60° C.

The wax may also be removed by melting or sublimation. After merging the heads and disks, the entire file is placed in an oven at a temperature above the wax melting point until the wax is removed. This method is preferable for a system that is not self-lubricating, and does not have a reservoir of liquid lubricant which can be used to dissolve the wax.

Another embodiment of the invention coats the slider with a thin layer of wax using a wax vapor technique. This embodiment substitutes for wax embedding the slider after forming the head suspension assembly or molding the wax onto the slider/suspension assembly. The head suspension assembly is placed into a holder. Preferably, the holder is at the elevated temperature of the wax vapor. The head suspension assembly and holder then pass through an enclosure saturated with wax vapors. The wax condenses onto the cooler slider end.

Vapor application coats the slider end with a uniform, thin layer of wax to a tolerance of a few micrometers of thickness. Once the slider end heats up to the wax vapor temperature, no more wax condenses. This application can apply about 1 to 2 $\mu$m of wax. Other alternatives include applying a thin layer to the slider after assembly into the head suspension assembly with a second thin layer of wax applied prior to assembly to the actuator arm. Or a thin layer of wax can be first applied to the head suspension assembly and a thick layer of wax molded to the slider as described above in the preferred embodiment.

A thin layer of wax cannot hold the sliders in a back-to-back position, protect them from damage during handling nor guide them into the disk pack. The thin wax layer, however, sufficiently protects the slider and disk from contact forces, thereby reducing the tolerances needed during the merge. Merge tooling designs can accommodate tolerances of only 1 standard deviation ($\sigma$) rather than the 3$\sigma$ currently required. The reduced tolerances allow smaller spaces between the disks. The invention has several advantages. The thick layer of wax guards the head during transport and assembly. The wax shields the head from the damage that harsh handling causes. The wax eases the merge operation between the slider and the disk. In the preferred embodiment of the invention, both the head and the disk are coated with wax. The wax guides and lubricates the merge. The smooth wax surfaces glide better. During merge, the head squeezes into the tight space. The merge between the wax coated components has near zero to zero clearance. The head and disk appear to touch. However, only the wax coatings touch. Further, the wax absorbs the brunt of the contact pressure, thereby cushioning the head and disk. Since the wax has a low shear strength, it can be thicker than the actual clearance between the disks. If the wax coated slider does not fit within the space, a layer of wax shears away allowing the slider to fit. Merge tooling designs can decrease the amount of tolerance required, allowing closer spacing between disks.

The wax coating guards against scraping the disk with the hard slider while manipulating them during the merge and movement to the landing pad. The smooth wax surfaces lessen the chance of scratching the disk while touching. The wax protects the disk against shock or touching during movement to the landing zone. Since the wax prevents the disk and slider from actually touching, the hard slider cannot scrape the disk.

Another advantage is the ease of removing the wax. The wax is simply melted away by heating the disk drive above the melting point of the wax. Any residual wax is removed by spinning up the disk drive and is removed in the disk drive lubrication system. In a recirculating lubricant system, the wax readily solubilizes into the lubricant. The solubilized wax adds additional lubricant to the lubricating system.

While the invention has been particularly shown and described with reference to a preferred embodiment, it will be understood by those skilled in the art that various changes in form and detail may be made therein without departing from the spirit and scope of the invention.

What is claimed is:

1. A method of assembling a disk drive of a computer having a plurality of disks included therein, the method comprising the steps of:
   mounting a slider with an associated head to a suspension to form a head suspension assembly, the head suspension assembly having a slider end and an opposite end;
   coating at least a portion of the slider end with a layer of wax;
   merging the head suspension assembly with the disks of the disk drive by sliding the slider end over a selected disk to a predetermined landing zone; and thereafter removing the wax.

2. A method of assembling a disk drive of a computer having a plurality of disks included therein, the method comprising the steps of:
   mounting a slider with an associated head to a suspension to form a head suspension assembly, the head suspension assembly having a slider end and an opposite end;
   embedding the slider end with a layer of wax;
   merging the head suspension assembly with the disks of the disk drive by sliding the slider end over a selected disk to a predetermined landing zone; and thereafter removing the wax.

3. A method of assembling a disk drive of a computer having a plurality of disks included therein, the method comprising the steps of:
   mounting a slider with an associated head to a suspension to form a head suspension assembly, the head suspension assembly having a slider end and an opposite end;
   embedding the slider end with a layer of wax;
   mounting the opposite end of the head suspension assembly onto an arm;
   molding wax onto the slider end of the head suspension assembly;
   merging the head suspension assembly with the disks of the disk drive by sliding the slider end over a selected disk to a predetermined landing zone; and thereafter removing the wax.

4. The method of claim 3 wherein a plurality of head suspension assemblies are merged with a plurality of disks located within the computer disk drive.

5. The method of claim 3 wherein the wax melts between about 25° C. and 100° C.

6. The method of claim 5 wherein the wax melts between about 25° C. and 75° C.

7. The method of claim 5 wherein the wax is selected from the group consisting of:
plant waxes;
animal waxes;
mineral waxes;
synthetic waxes; or
combinations of the above.

8. The method of claim 7 wherein the wax is selected from the group consisting of octadecane, stearic acid, palmitic acid, a 50:50 [w/w] mixture of stearic:palmitic acid, 1-docosanol, or any combination thereof.

9. The method of claim 3 wherein the slider is embedded in wax by dipping the slider into molten wax.

10. The method of claim 3 wherein prior to guiding the merge, the disks, having a data storage surface, are coated with wax covering an annular portion of the data storage surface.

11. The method of claim 10 wherein the disks are coated with wax by dipping the disks into molten wax.

12. The method of claim 10 wherein the disks are coated with wax by spraying the disks with molten wax.

13. The method of claim 10 wherein the disks are coated with wax by using a spin application with molten wax to apply the wax to the disks.

14. The method of claim 3 wherein the wax on the slider end of the head suspension assembly is about 1 $\mu$m to 40 $\mu$m thick.

15. The method of claim 3 wherein two layers of wax are applied to the slider end of the head suspension assembly, the method comprising:
applying a thin first layer of wax to the slider end of the head suspension assembly and
applying a second, thicker layer of wax, having a lower melting point than the wax of the first layer, to the slider end of the head suspension assembly.

16. The method of claim 15 wherein the thin layer of wax is about 1 $\mu$m to 5 $\mu$m thick.

17. The method of claim 15 wherein the thick layer of wax is applied by dipping.

18. The method of claim 15 wherein the thick layer of wax is applied by molding.

19. The method of claim 3 wherein the wax is removed by melting above the melting point of the wax.

20. The method of claim 3 wherein the wax is removed by solubilizing into a lubricant of the disk drive system.

21. The method of claim 3 wherein the wax is removed by melting above the wax melting point and solubilizing into a lubricant of the disk drive system.

22. A method of assembling a disk drive of a computer having a plurality of disks included therein, the method comprising the steps of:
mounting a slider with an associated head to a suspension to form a head suspension assembly, the head suspension assembly having a slider end and an opposite end;
embedding the slider end of the head suspension assembly by first dipping the slider end into molten wax then allowing the wax to harden;
mounting the opposite end of the head suspension assembly onto an arm;
embedding the slider end of the head suspension assembly mounted onto an actuator arm in wax by placing the slider end into a mold, adding molten wax to fill the mold, hardening the wax and removing the mold;
merging the head suspension assembly with the disks of the disk drive by sliding the slider end over a selected disk to a predetermined landing zone; and
heating the head suspension assembly and the disks above the melting point of the wax;
allowing the wax to flow away from the head suspension assembly and the disks and
spinning up the disks by turning on the disk drive to remove any excess wax.

23. The method of claim 22 wherein a plurality of head suspension assemblies are merged with a plurality of disks located within the computer disk drive.

24. The method of claim 22 wherein the wax melts between about 25° C. and 100° C.

25. The method of claim 24 wherein the wax melts between about 25° C. and 75° C.

26. The method of claim 24 wherein the wax is selected from the group consisting of:
plant waxes;
animal waxes;
mineral waxes;
synthetic waxes; or
combinations of the above.

27. The method of claim 26 wherein the wax is selected from the group consisting of octadecane, stearic acid, palmitic acid, a 50:50 [w/w] mixture of stearic:palmitic acid, 1-docosanol, or any combination thereof.

28. A method of assembling a disk drive of a computer having a plurality of disks included therein, the method comprising the steps of:
mounting a slider with an associated head to a suspension to form a head suspension assembly, the head suspension assembly having a slider end and an opposite end;
placing the end of the head suspension assembly opposite the slider into a holder;
passing the head suspension assembly through an enclosure saturated with wax vapors to condense the wax onto the slider to vapor apply the wax;
merging the head suspension assembly with the disks is by sliding the slider end over the disks to a predetermined landing zone; and
thereafter removing the wax.

29. The method of claim 28 wherein a plurality of head suspension assemblies are merged with a plurality of disks located within the computer disk drive.

30. The method of claim 28 wherein the wax melts between about 25° C. and 100° C.

31. The method of claim 30 wherein the wax melts between about 25° C. and 75° C.

32. The method of claim 30 wherein the wax is selected from the group consisting of:
plant waxes;
animal waxes;
mineral waxes;
synthetic waxes; or
combinations of the above.

33. The method of claim 32 wherein the wax is selected from the group consisting of octadecane, stearic acid, palmitic acid, a 50:50 [w/w] mixture of stearic:palmitic acid, 1-docosanol, or any combination thereof.

34. The head suspension assembly of claim 33 wherein the slider has an air bearing surface.

35. The head suspension assembly of claim 33 wherein the slider is a skiing slider for a self-replenishment lubrication system.

36. The method of claim 28 wherein the wax is removed by melting above the wax melting point and solubilizing into a lubricant of the disk drive system.

37. The method of claim 28 wherein the wax is removed by melting above the melting point of the wax.

38. The method of claim 28 wherein the wax is removed by solubilizing into a lubricant of the disk drive system.

* * * * *